(12) United States Patent
Endo et al.

(10) Patent No.: US 10,468,811 B2
(45) Date of Patent: Nov. 5, 2019

(54) PACKING ARRANGEMENT STRUCTURE

(71) Applicant: Yazaki Corporation, Tokyo (JP)

(72) Inventors: Takuya Endo, Shizuoka (JP);
Tomoharu Suzuki, Shizuoka (JP);
Ayumu Ishikawa, Shizuoka (JP)

(73) Assignee: YAZAKA CORPORATION, Tokyo (JP)

( * ) Notice: Subject to any disclaimer, the term of this patent is extended or adjusted under 35 U.S.C. 154(b) by 0 days.

(21) Appl. No.: 15/997,675

(22) Filed: Jun. 4, 2018

(65) Prior Publication Data

US 2018/0358737 A1   Dec. 13, 2018

(30) Foreign Application Priority Data

Jun. 9, 2017 (JP) ................. 2017-114487

(51) Int. Cl.
| | |
|---|---|
| *H01R 13/52* | (2006.01) |
| *H01R 13/502* | (2006.01) |
| *H01R 13/629* | (2006.01) |
| *H01R 13/6581* | (2011.01) |
| *H01R 13/74* | (2006.01) |

(52) U.S. Cl.
CPC ....... *H01R 13/5202* (2013.01); *H01R 13/502* (2013.01); *H01R 13/62933* (2013.01); *H01R 13/6581* (2013.01); *H01R 13/74* (2013.01); *H01R 2201/26* (2013.01)

(58) Field of Classification Search
CPC ............ H01R 12/5202; H01R 12/5205; H01R 12/5221; H01R 12/5219; H01R 12/965
USPC ........................................ 439/271, 589, 587
See application file for complete search history.

(56) References Cited

U.S. PATENT DOCUMENTS

| | | | |
|---|---|---|---|
| 5,879,178 A | * | 3/1999 | Koumatsu .......... H01R 13/5219 439/271 |
| 2012/0100753 A1 | | 4/2012 | Omae et al. |
| 2015/0288090 A1 | | 10/2015 | Shigeta et al. |

(Continued)

FOREIGN PATENT DOCUMENTS

| | | |
|---|---|---|
| JP | 3-11172 U | 2/1991 |
| JP | 5-73873 U | 10/1993 |
| JP | 8-96884 A | 4/1996 |

(Continued)

OTHER PUBLICATIONS

Japanese Office Action for the related Japanese Patent Application No. 2017-114487 dated Jun. 4, 2019.

*Primary Examiner* — Phuong K Dinh (74) *Attorney, Agent, or Firm* — Kenealy Vaidya LLP (57) ABSTRACT

Provided is a packing arrangement structure which can prevent rotation of a packing. The packing arrangement structure includes an annular packing disposed between a first member and a second member. The packing includes an annular portion main body extending in an axial direction of the packing and a protruding portion protruding from the annular portion main body in an outward direction or in an inward direction. The first member is provided with a recessed portion configured to house the protruding portion and formed into a shape corresponding to the protruding portion. The protruding portion is formed such that a circumferential dimension of a top portion thereof located in a protruding direction is greater than a circumferential dimension between basal parts thereof.

6 Claims, 8 Drawing Sheets

(56) References Cited

U.S. PATENT DOCUMENTS

2015/0325947 A1  11/2015  Wang et al.

FOREIGN PATENT DOCUMENTS

| JP | 2011-119120 A | 6/2011 |
| JP | 2013-235761 A | 11/2013 |
| JP | 2014-99255 A | 5/2014 |

* cited by examiner

PACKING ARRANGEMENT STRUCTURE

CROSS REFERENCE TO RELATED APPLICATION

The priority application Japanese Patent Application No. 2017-114487 upon which this patent application is based is hereby incorporated by reference.

BACKGROUND

Field of the Invention

The present disclosure relates to a packing arrangement structure.

Description of the Related Art

An automobile is mounted with various electronic devices, and is provided with a wire harness for providing power and transmitting control signals and such to the electronic devices. The wire harness includes a plurality of electric wires and a connector, and this connector is fitted to a connector of the electronic device or to a connector of another wire harness, thereby connecting the wire harness to the electronic device and to another wire harness.

Figure 9:
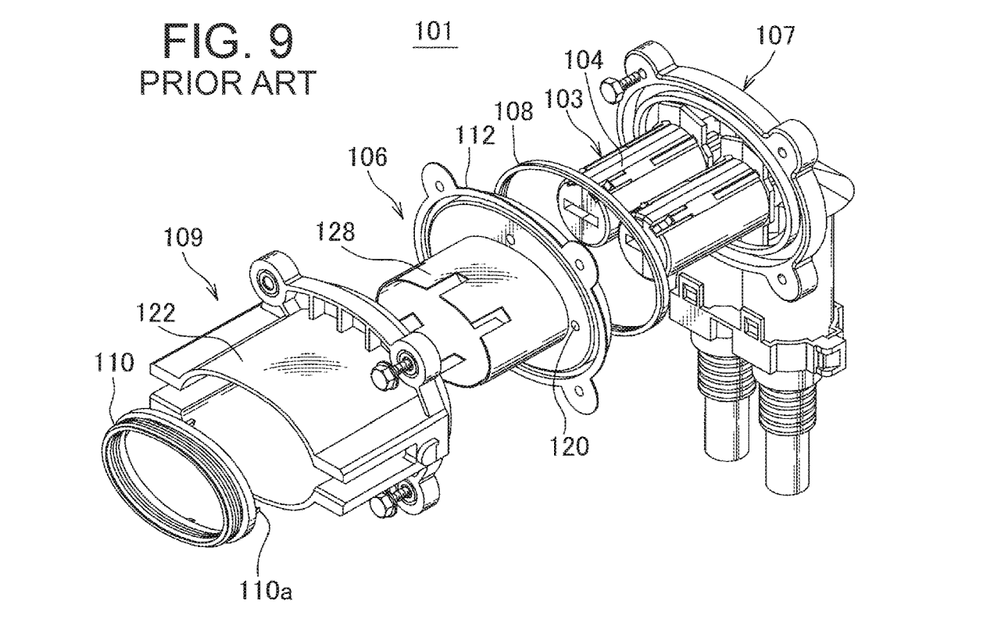
FIG. 9 is an exploded perspective view of a conventional L-shaped connector.
Figure 10:
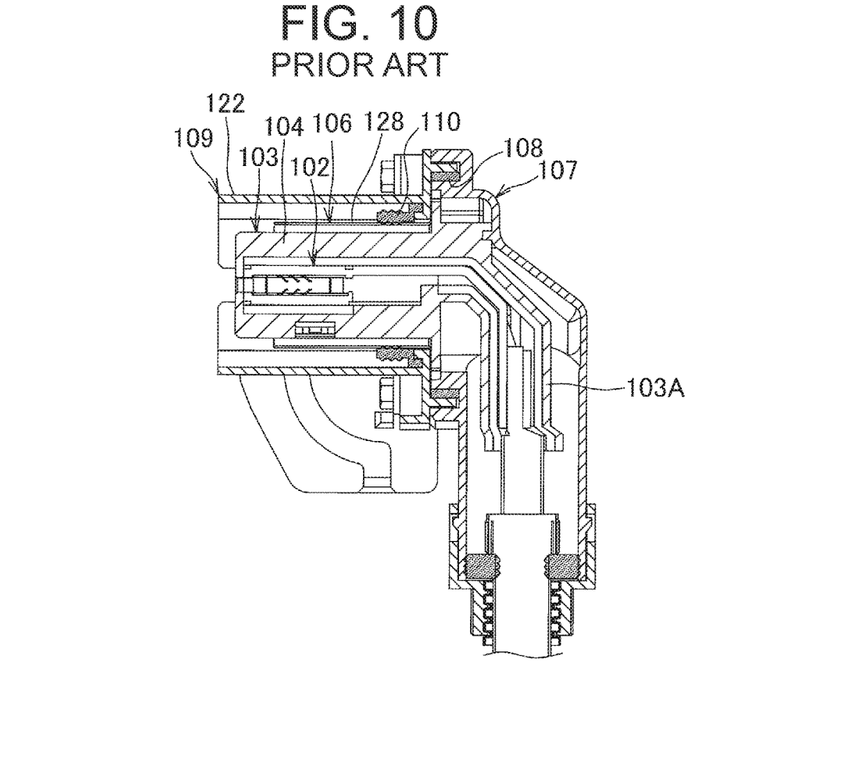
FIG. 10 is a cross-sectional view showing an assembled state of the conventional L-shaped connector shown in FIG. 9.

A connector used for such wire harness includes a known L-shaped connector configured to be attached to terminals of two shielded cables for high-voltage used in an electric vehicle (EV) or a hybrid electric vehicle (HEV), as disclosed in Japan Patent Application Publication No. 2011-119120 (hereinafter, "JP'120"), for example. FIG. 9 is an exploded perspective view showing a conventional L-shaped connector. FIG. 10 is a cross-sectional view showing an assembled state of the conventional L-shaped connector shown in FIG. 9.

As shown in FIG. 9 and FIG. 10, the conventional L-shaped connector disclosed in JP'120 includes an L-like inner housing 103 made of insulating resin and housing an L-shaped terminal 102 (shown in FIG. 10), a shield shell 106 made of conductive metal and covering a horizontal tubular portion 104 of the inner housing 103, an aluminum housing 107 made of conductive metal and housing a vertical rectangular tubular portion 103A of the inner housing 103, an annular shield packing 108 made of rubber to provide waterproof between the shield shell 106 and the aluminum housing 107, an outer housing 109 made of insulating resin and covering the shield shell 106, and an annular housing packing 110 made of rubber to provide waterproof between the shield shell 106 and the outer housing 109. The housing packing 110 includes a protrusion 110a provided at a rear end thereof, and this protrusion is inserted into and fitted to a small hole 120 of a flange portion 112 of the shield shell 106 to fix the housing packing 110. Each of the packings 108, 110 is formed into a plate-like shape having a rectangular cross section.

As shown in FIG. 9 and FIG. 10, at the flange portion 112 side of the shield shell 106, the housing packing 110 is disposed between and closely attached to an outer face of a peripheral wall 128 and an inner face of a peripheral wall 122 of the outer housing 109. An inner face of a mating connector housing is closely attached to an outer face of the housing packing 110. As a result, water drop is prevented from entering inside the L-shaped connector 101 via a gap between the outer face of the mating connector housing (not shown) and the inner face of the outer housing 109.

SUMMARY OF THE INVENTION

However, the conventional L-shaped connector 101 has a following drawback. That is, during the assembling of the connector, the housing packing 110 of the conventional L-shaped connector 101 may be rotated with respect to a predetermined position when an operator touches it. That is, in the conventional L-shaped connector 101, the protrusion 110a of the housing packing 110 is inserted into and fitted to the small hole 120 of the flange portion 112 of the shield shell 106 to fix the housing packing 110 to the shield shell 106, thereby preventing the housing packing 110 from rotating with respect to the predetermined position. If large force is applied, the protrusion 110a may be deformed and removed out from the small hole 120, and the housing packing 110 may be rotated and displaced with respect to the shield shell 106.

An object of the present invention is to provide a packing arrangement structure which can prevent rotation of a packing.

To achieve the above-mentioned object, the present invention according to a first aspect provides a packing arrangement structure configured to dispose an annular packing between a first member and a second member, comprising the first member and the annular packing, wherein the packing includes an annular portion main body extending in an axial direction of the packing and a protruding portion protruding from the annular portion main body in an outward direction or in an inward direction, wherein the first member is provided with a recessed portion configured to house the protruding portion and formed into a shape corresponding to the protruding portion, wherein the protruding portion is formed such that a circumferential dimension of a top portion thereof located in a protruding direction is greater than a circumferential dimension between basal parts thereof.

According to a second aspect, the protruding portion is formed into a trapezoidal shape.

According to a third aspect, the recessed portion includes a first face located facing the top portion of the protruding portion, and a pair of second faces located between the first face and a reference face which can contact the annular portion main body. The first member is configured such that an angle between the reference face and each of the second faces is an acute angle.

According to the present invention described above, when the force in the rotation direction is applied to the packing, the protruding portion abuts on an inner face located in the rotation direction of the recessed portion, thus the force is applied on the protruding portion in the direction away from the annular portion main body.

Consequently, even if the packing is applied with the force in the rotating direction, the rotation of the protruding portion with respect to the recessed portion can be prevented. As a result, the rotation of the packing can be prevented.

DETAILED DESCRIPTION OF EXEMPLARY EMBODIMENT OF THE INVENTION

Figure 1:
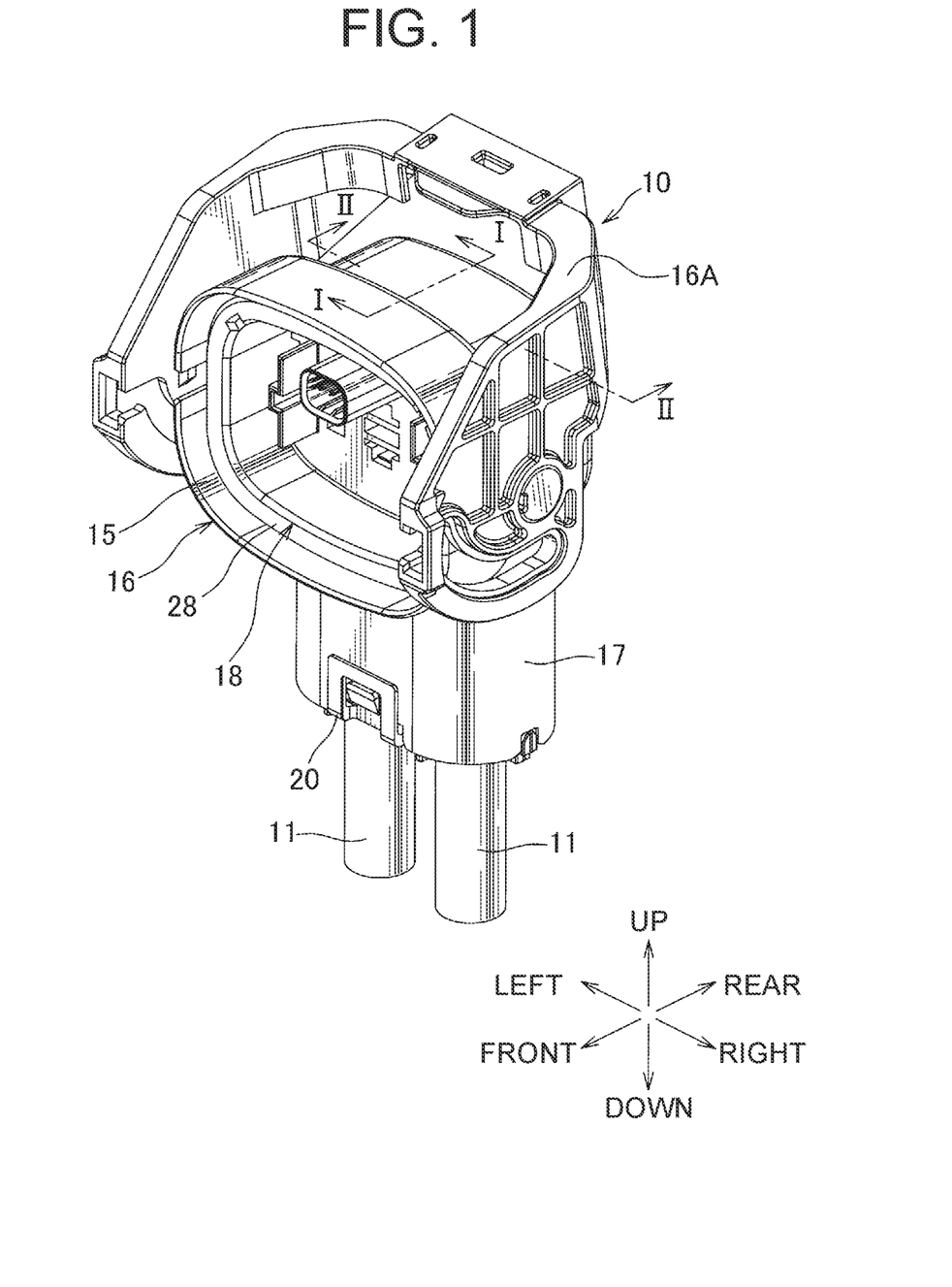
FIG. 1 is a perspective view of a connector including a packing arrangement structure according to one embodiment of the present invention.
Figure 2:
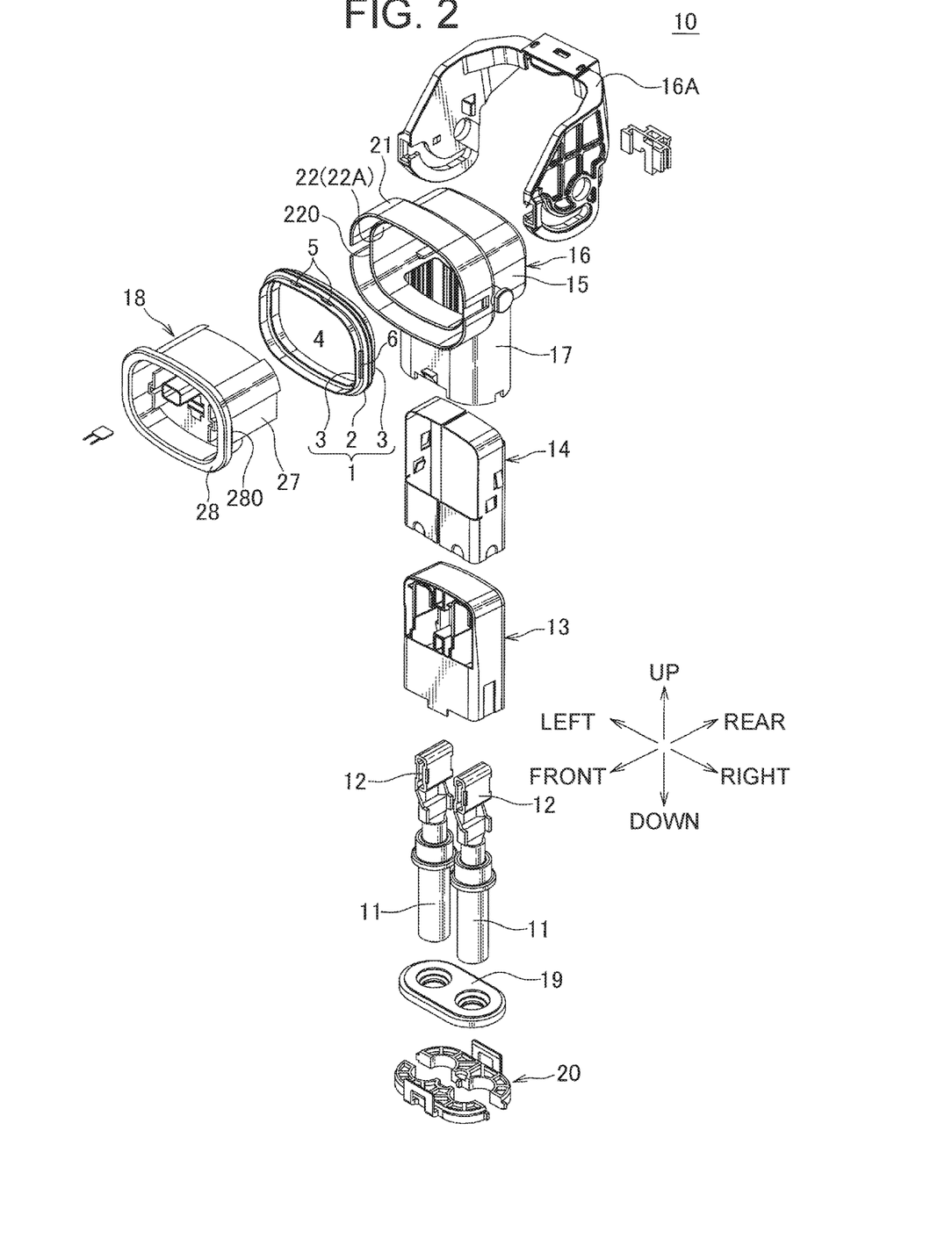
FIG. 2 is an exploded perspective view of the connector.

The following will explain an exemplary embodiment of the present invention in reference to the drawings. FIG. 1 is a perspective view of a connector 10 including a packing arrangement structure according to one embodiment of the present invention. FIG. 2 is an exploded perspective view of the connector 10.

As shown in FIG. 1 and FIG. 2, the connector 10 of this embodiment includes a pair of female terminals 12, 12 (shown in FIG. 2) configured to be connected to a pair of shield electric wires 11, 11, an inner housing 13 (shown in FIG. 2), a shield shell 14 (shown in FIG. 2), and an outer housing 16 having a hood portion 15 to which a mating connector (not shown) is fitted. Hereinafter, the connector 10 is referred to as "female connector 10", and the mating connector is referred to as "male connector".

In this embodiment, a fitting direction of the female connector 10 to the male connector is referred to as "front-rear direction" or "axial direction", an extending direction of the pair of shield electric wires 11, 11 is referred to as "up-down direction", and a direction orthogonal to both of "front-rear direction" and "up-down direction" is referred to as "right-left direction". Further, of "front-rear direction", when viewed from the female connector 10, the male connector side is referred to as "front" and the side distant from the male connector is referred to as "rear".

As shown in FIG. 2, the pair of female terminals 12, 12 is connected to a terminal of one of the pair of shield electric wires 11, 11. The inner housing 13 houses the female terminals 12, 12. The shield shell 14 is formed into a shape that can cover the inner housing 13. The outer housing 16 includes the hood portion 15, and a tubular portion 17 configured to lead out a terminal of another one of the shield electric wires 11, 11 to outside.

Furthermore, the female connector 10 includes a front holder 18 which is attached to the hood portion 15 and to which the male connector is fitted, an annular packing 1 for ensuring waterproof performance at a fitting portion (not shown) of the female and male connectors, a mat seal 19 attached to the shield electric wires 11, 11, and a rear holder 20 supporting the mat seal 19.

Furthermore, as shown in FIG. 1 and FIG. 2, the female connector 10 is provided with a lever 16A which is rotatably supported to the outer housing 16. By rotating the lever 16A while the connector housing of the male connector is located near the front holder 18 of the female connector 10, the female connector 10 and the male connector can be fitted and detached with respect to each other with small operation force.

Figure 3:
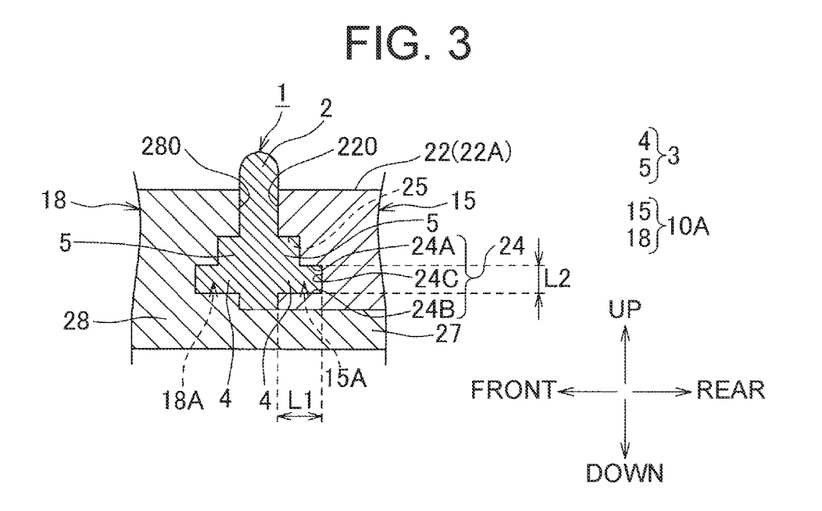
FIG. 3 is a partial cross-sectional view taken along a I-I line in FIG. 1.

FIG. 3 is a cross-sectional view focusing on the positional relationship between the hood portion 15 of the outer housing 16, the front holder 18 and the packing 1. In FIG. 3, a later-described outer side wall 21 of the hood portion 15 is omitted. In this embodiment, as shown in FIG. 3, the packing 1 is sandwiched and supported between the hood portion 15 and the front holder 18, while being disposed between the hood portion 15 and the front holder 18, and the connector housing (second member) of the male connector. In this embodiment, the hood portion 15 and the front holder 18 to be attached to the hood portion 15 are referred to as "housing body 10A (first member)". The packing 1 disposed between the housing body 10A and the connector housing of the male connector as described above ensures waterproof performance of the fitting portion (not shown) of the female and male connectors.

Further, as shown in FIG. 2 and FIG. 3, restriction housing portions 15A, 18A (shown in FIG. 3) are formed on the hood portion 15 and the front holder 18, respectively. The restriction housing portions 15A, 18A are configured to house a later-described insertion portion 3 (shown in FIG. 2) of the packing 1 while restricting the rotation of the packing 1. In the following, the restriction housing portion provided to the hood portion 15 is referred to as the hood restriction housing portion 15A, and the restriction housing portion provided to the front holder 18 is referred to as the holder restriction housing portion 18A.

Figure 4A:
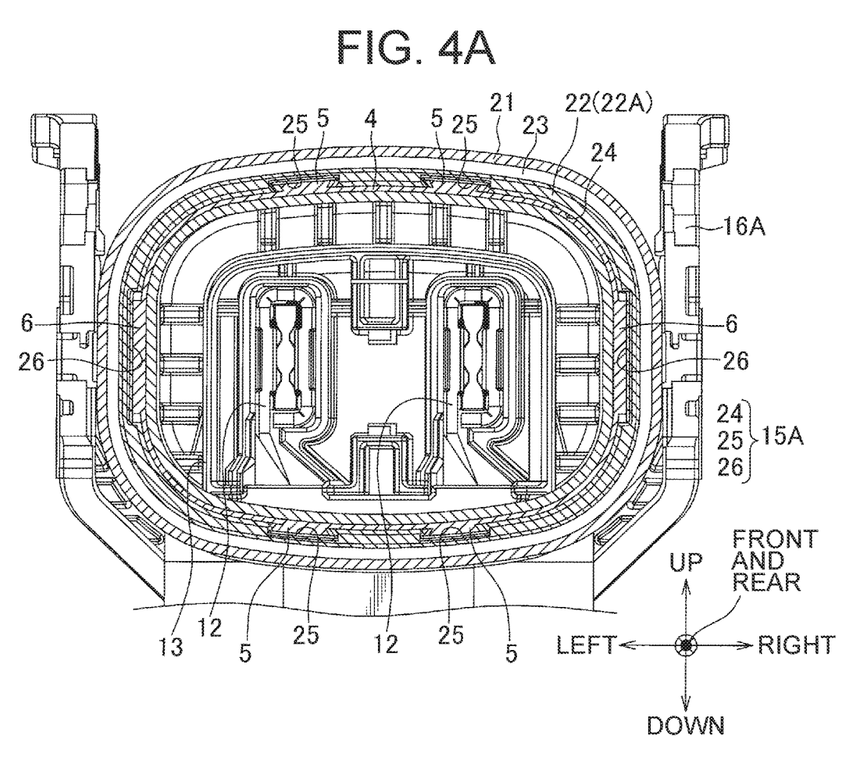
FIG. 4A is a cross-sectional view taken long a II-II line in FIG. 1.
Figure 4B:
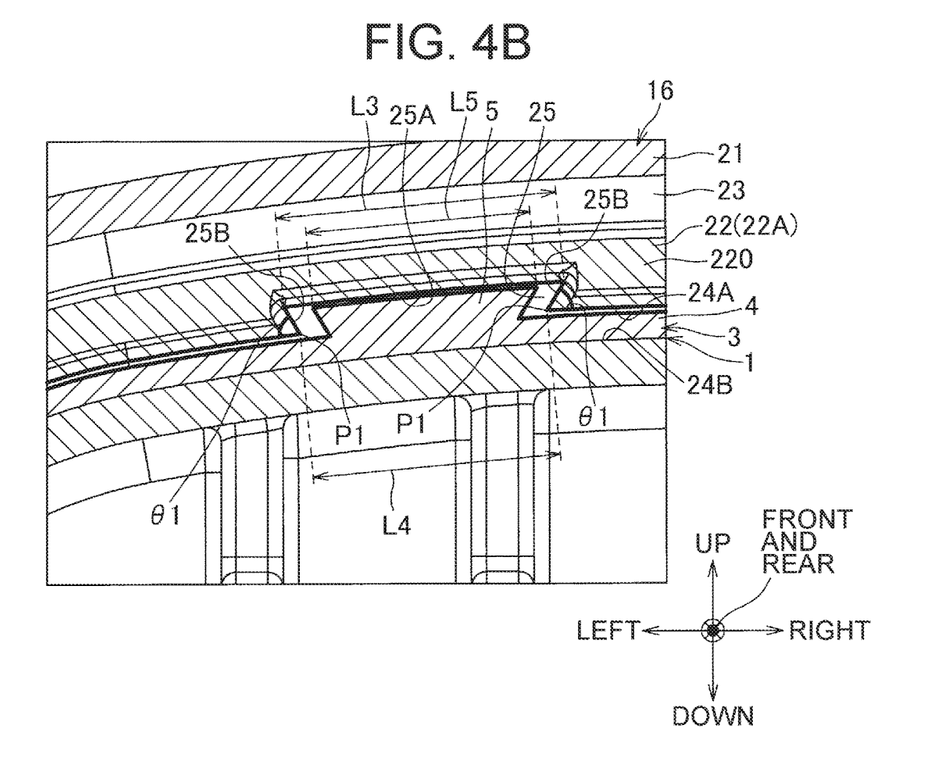
FIG. 4B is an enlarged view of a portion of the packing arrangement structure shown in FIG. 4A.

As shown in FIGS. 4A and 4B, the hood portion 15 includes a tubular outer wall portion 21, a tubular inner wall portion 22 located inside the outer wall portion 21, and an insertion groove 23 which is located between the outer wall portion 21 and the inner wall portion 22 and through which the connector housing of the male connector is inserted.

The inner wall portion 22 is constituted of a peripheral wall 22A having a thickness, as shown in FIG. 4B. As shown in FIG. 3, the front holder 18 is attached, via the packing 1, to a front end face 220 of the peripheral wall 22A. The hood restriction housing portion 15A is formed at this front end face 220 of the peripheral wall 22A.

As shown in FIG. 3, the hood restriction housing portion 15A is formed into a groove which is recessed with respect to the front end face 220 (i.e., the face located on the front holder 18 side) of the peripheral wall 22A. That is, the hood restriction housing portion 15A is open at its front. The hood restriction housing portion 15A is formed into a shape that can house the insertion portion 3 of the packing 1.

As shown in FIG. 4A, the hood restriction housing portion 15A includes a housing portion main body 24 housing a later-described insertion plate portion 4 of the packing 1, a restriction housing portion 25 housing a later-described rotation restriction portion 5 of the packing 1, and a positioning housing portion 26 housing a later-described positioning portion 6 of the packing 1.

As shown in FIG. 3, the housing portion main body 24 includes an outer circumferential face 24A, an inner circumferential face 24B located at an inner peripheral side of the outer circumferential face 24A, and an in-out continuous face 24C continuous with the outer circumferential face 24A and with the inner circumferential face 24B. Further, the housing portion main body 24 is formed such that its dimension L1 in an axial direction (i.e., an axial dimension L1 of the inner circumferential face 24B) is substantially equal to an axial dimension of the insertion plate portion 4 of the packing 1, and that its dimension L2 in the direction orthogonal to the axial direction (i.e., a dimension L2 of the in-out continuous face 24C) is substantially equal to the plate thickness of the insertion plate portion 4 of the packing 1.

As shown in FIG. 3, the restriction housing portion 25 is positioned at the opened-side of the housing portion main body 24 and is formed continuous with the outer circumferential face 24A of the housing portion main body 24. As shown in FIG. 4B, the restriction housing portion 25 is formed bilaterally symmetric and includes a parallel face 25A (first face) that is substantially parallel to the inner circumferential face 24B, and a pair of inner faces 25B, 25B (pair of second faces) positioned between the parallel face 25A and the outer circumferential face 24A (reference face) of the housing portion main body 24. The pair of inner faces 25B, 25B is constituted of flat faces. The pair of inner faces 25B, 25B is formed such that an angle between each of the inner faces 25B, 25B and the outer circumferential face 24A of the housing portion main body 24 is an acute angle $\theta 1$. In other words, a circumferential dimension L3 of the parallel face 25A of the restriction housing portion 25 is greater than a circumferential dimension L4 between boundary locations P1 (basal parts) corresponding to the boundary between each of the inner faces 25B, 25B and the outer circumferential face 24A of the housing portion main body 24 (i.e., L3>L4). Further, in this embodiment, the circumferential dimension L4 between the boundary locations P1 of each of the inner faces 25B, 25B and the outer circumferential face 24A of the housing portion main body 24 is formed greater than a circumferential dimension L5 of a top face 5A of the packing 1 (L4>L5).

As shown in FIG. 2 and FIG. 3, the front holder 18 includes a holder main body 27 to be inserted inside the inner wall portion 22, and a flange portion 28 provided at a front end of the holder main body 27 and positioned opposing to the front end face 220 of the inner wall portion 22. As shown in FIG. 3, a holder restriction housing portion 18A is formed at a rear end face 280 (i.e., a face on the inner wall portion 22 side) of the flange portion 28. The holder restriction housing portion 18A is formed into a groove which is recessed with respect to the rear end face 280 of the flange portion 28. In this embodiment, the hood restriction housing portion 15A and the holder restriction housing portion 18A differs only in the position of formation and are formed to have a substantially identical shape. Thus, detailed explanation of the holder restriction housing portion 18A is omitted.

Figure 5A:
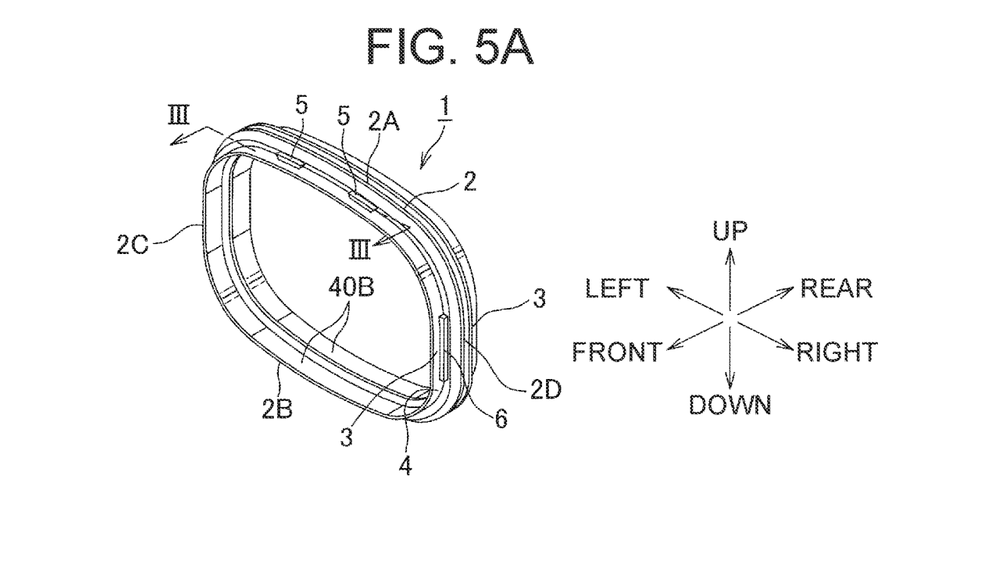
FIG. 5A is a perspective view showing a packing included in the packing arrangement structure.
Figure 5B:
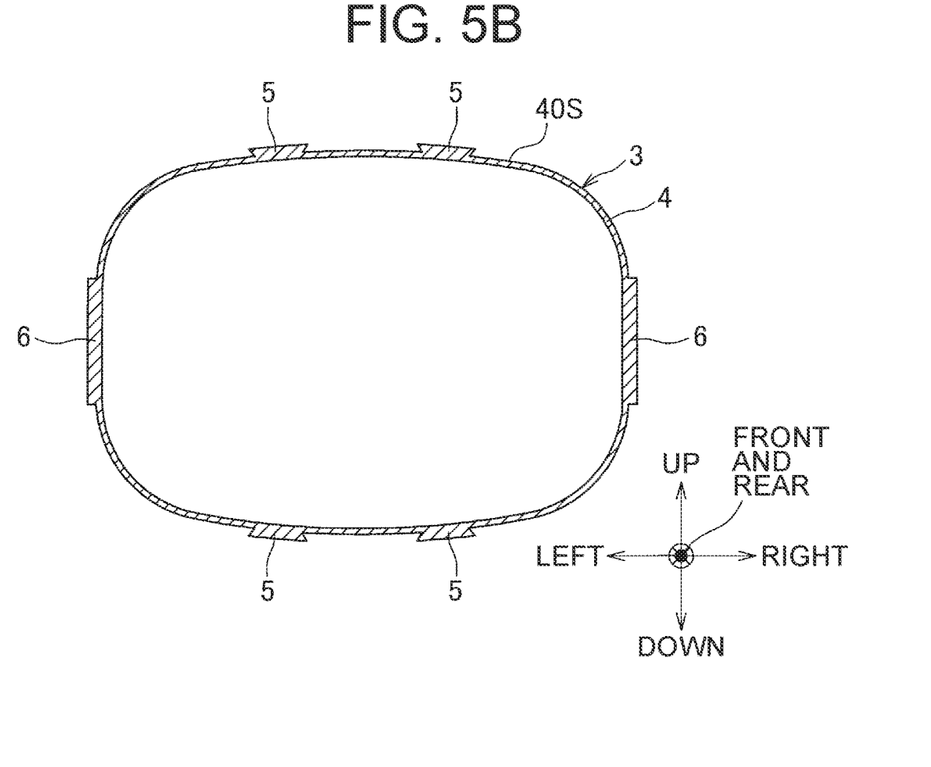
FIG. 5B is a cross-sectional view taken along a line in FIG. 5A.
Figure 5C:
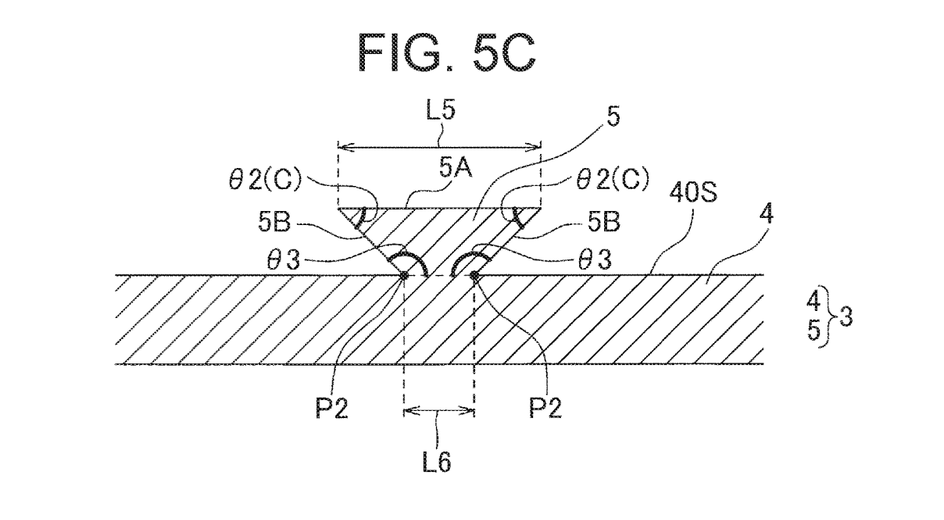
FIG. 5C is an enlargement view of a portion of FIG. 5B.

The packing 1 is constituted of an elastic body such as rubber. As shown in FIGS. 5A, 5B and 5C, the packing 1 includes an annular packing main body 2 (shown in FIG. 5A) and a pair of insertion portions 3 which is formed continuous with one side and the other side in the axial direction of the packing main body 2, respectively, and configured to be housed in the holder restriction housing portion 18A and the hood restriction housing portion 15A, respectively.

The packing 1 is configured such that, in the fitted state of the female and male connectors, the pair of insertion portions 3 is housed in the hood restriction housing portion 15A and the holder restriction housing portion 18A, respectively, and the packing main body 2 contacts the inner face of the connector housing of the male connector, thereby ensuring the waterproof performance of the fitting portion of the female and male connectors.

As shown in FIG. 5A, the packing main body 2 includes an upper side portion 2A, a lower side portion 2B located on the opposite side of the upper side portion 2A, a left side portion 2C and a right side portion 2D connecting the upper side portion 2A and the lower side portion 2B, and four corner portions connecting the upper side portion 2A, the lower side portion 2B, the left side portion 2C and the right side portion 2D.

The upper side portion 2A, when viewed from front, is constituted of a curved surface which is convexed upward. The lower side portion 2B is constituted of a curved surface which is convexed downward. The left side portion 2C is constituted of a curved surface which is convexed toward left side. The right side portion 2D is constituted of a curved surface which is convexed toward right side. The four corner portions are respectively constituted of a curved surface provided between the upper side portion 2A and the left side portion 2C, between the left side portion 2C and the lower side portion 2B, between the lower side portion 2B and the right side portion 2D, between the right side portion 2D and the upper side portion 2A, respectively, to make these side portions be smoothly continuous with each other.

In a manner as described above, the packing main body 2 is formed into a track-like shape (in terms of athletic sport). That is, the packing main body 2 is formed such that, in the natural state where no outer force is applied, the packing main body 2 has a shape that is not a circle having a linear distance from a center thereof to the outer edge that is substantially equal at any position. Examples of the packing main body 2 may be formed into an oval shape, a quadrangular shape or a polygonal shape.

As shown in FIGS. 5A and 5B, the pair of insertion portions 3 integrally includes the annular insertion plate portion 4 (annular portion main body), a plurality of (four, in this embodiment) rotation restriction portions 5 (protruding portions) protruding outward from the insertion plate portion 4, and a plurality of (two, in this embodiment) positioning portions 6 protruding outward from the insertion plate portion 4.

As shown in FIGS. 5A and 5B, the insertion plate portion 4 is arranged so as to extend in the axial direction of the packing main body 2. The insertion plate portion 4 is formed such that its thickness dimension orthogonal to the axis is substantially constant.

Each of the upper side portion 2A and the lower side portion 2B is provided with two rotation restriction portions 5, as shown. These rotation restriction portions 5 are arranged separate from each other in the circumferential direction of the insertion plate portion 4.

As shown in FIG. 5C, the respective rotation restriction portions 5 are formed into an isosceles trapezoidal shape (trapezoidal shape) when viewed from front. That is, the rotation restriction portion 5 is constituted of a top face 5A (top portion) protruding outward from an outer circumferential face 40S (hereinafter called "packing reference face 40S") of the insertion plate portion 4 and extending substantially parallel with the packing reference face 40S, and a pair of side faces 5B, 5B continuous with the packing reference face 40S and each of both ends of the top face 5A.

For each of the rotation restriction portions 5, the top face 5A and the pair of side faces 5B are constituted of a flat face, respectively, as shown in FIG. 5C. Further, the rotation restriction portion 5 is formed such that an angle $\theta 2$ (hereinafter, referred to as "angle $\theta$") between the top face 5A and each of the side faces 5B is an acute angle, and an angle $\theta 3$ between the packing reference face 40S and each of the side faces 5B is an obtuse angle. That is, the rotation restriction portion 5 is formed such that a circumferential dimension L5 of the top face 5A (i.e., the circumferential dimension of the top portion in the protruding direction) is greater than a circumferential dimension L6 between boundary locations P2 (basal parts) of the packing reference face 40S and the side faces 5B.

As shown in FIG. 5B, one positioning portion 6 is provided at each of the left side portion 2C and the right side portion 2D. Each of the positioning portions 6 is formed into a rectangular shape with its long side direction corresponding to the circumferential direction.

Next, an effect of the packing arrangement structure described above will be explained with reference to FIGS. 6A and 6B.

Figure 6A:
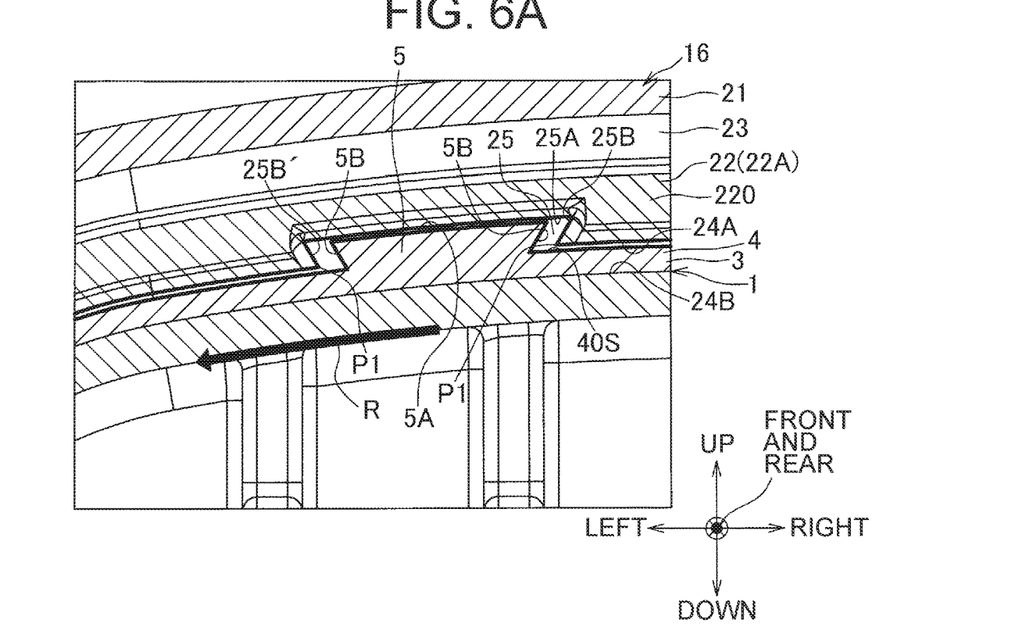
FIG. 6A illustrates application of force to the packing in a rotation direction.
Figure 6B:
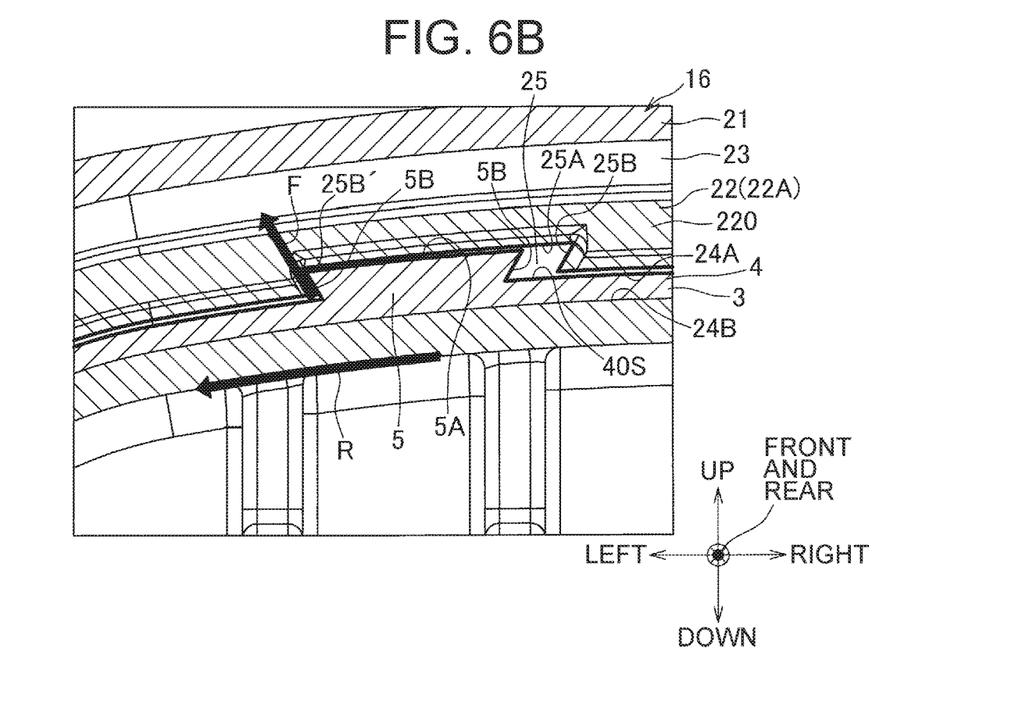
FIG. 6B illustrates effect provided by the packing arrangement structure.

As described above with reference to the conventional art, there is a concern that, since the packing is not formed into a circle in shape, the waterproof performance of the packing may be lowered when the packing is applied with force in the rotation direction R and displaced in the rotation direction R from the predetermined position. According to the present disclosure, as shown in FIGS. 6A and 6B, when the force in the rotation direction R is applied to the packing 1, the rotation restriction portion 5 (protruding portion) abuts on an inner face 25B' in the rotation direction R of the restriction housing portion 25 (recessed portion), thus the force F (indicated in FIG. 6B) is applied on the rotation restriction portion 5 in the direction outwardly away from the insertion plate portion 4 (annular portion main body), thereby preventing the rotation restriction portion 5 from detached from the restriction housing portion 25. Consequently, even if the packing 1 is applied with the force in the rotating direction, the packing 1 can be prevented from being displaced from the predetermined position in the housing body 10A in the rotating direction R, thereby ensuring the waterproof performance of the fitting portion of the female and male connectors.

The present invention is not limited to the above-described embodiment and may include other constitutions which can achieve the object of the present invention, and modifications as described below are included in the present invention.

Figure 7:
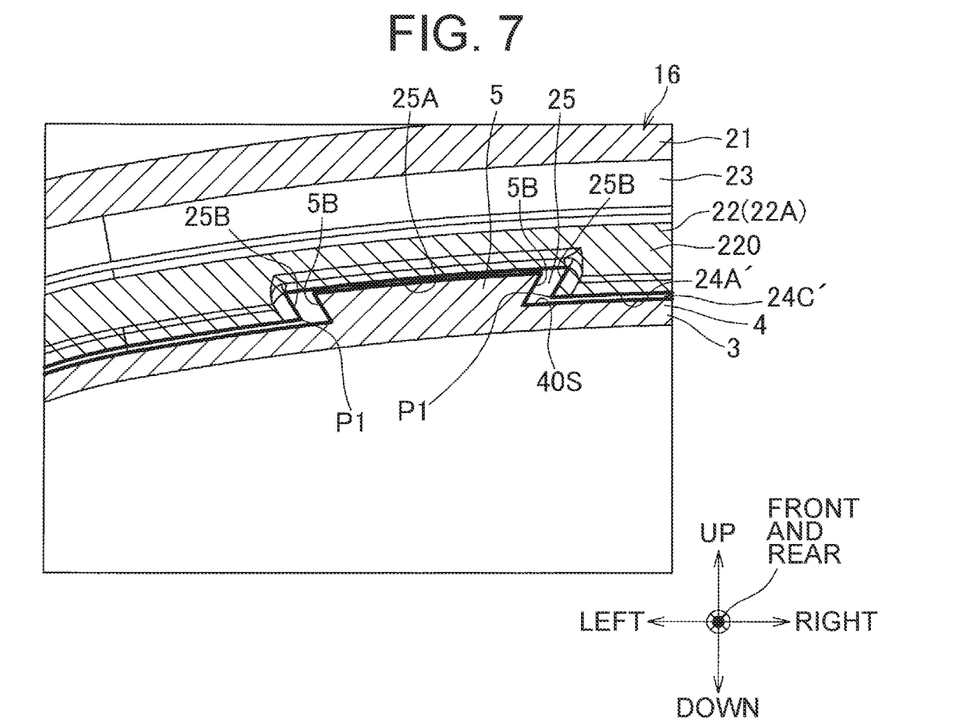
FIG. 7 is a front view of a modified example of the packing arrangement structure.

In the abode-described embodiment, the insertion plate portion 4 of the packing 1 is housed in the housing portion main body 24 having the outer circumferential face 24A and the inner circumferential face 24B, as shown in FIG. 4B. However, the present invention is not limited to this. As shown in FIG. 7, a housing portion main body 24' may include an outer circumferential face 24A' and an in-out continuous face 24C' continuous with the outer circumferential face 24A'. In this case, the inner circumferential face 24B may be omitted. FIG. 7 is a front view showing a modified example of the packing arrangement structure. In FIG. 7, the elements having the same or similar function or constitution as the above-described embodiment are indicated using the same reference signs to omit the explanation thereof.

Furthermore, in the above-described embodiment, each of the insertion portions 3 of the packing 1 includes the insertion plate portion 4 and the plurality of (e.g., four) rotation restriction portions 5 (protruding portions) protruding outward from the insertion plate portion 4. However, the present invention is not limited to this. The plurality of rotation restriction portions 5 may be provided so as to protrude inward from the insertion plate portion 4. In this case, it is preferable that the respect rotation restriction housing portions 25 are positioned inward with respect to the insertion plate portion 24.

Furthermore, in the above-described embodiment, the restriction housing portion 25 is formed such that the circumferential dimension L4 between the boundary locations P1 of each of the inner faces 25B, 25B and the outer circumferential face 24A of the housing portion main body 24 is greater than the circumferential dimension L5 of the top face 5A of the packing 1 (L4>L5). However, the present invention is not limited to this. The restriction housing portion 25 may be formed such that the circumferential dimension L4 between the boundary locations P1 of each of the inner faces 25B, 25B and the outer circumferential face 24A of the housing portion main body 24 is smaller than the circumferential dimension L5 of the top face 5A of the packing 1 (L4<L5). In this case, the packing 5 may be arranged such that, when the axial force is applied to the packing 1, the corner portions C of the rotation restriction portions 5 of the packing 1 are caught at the boundary locations P1 of the respective inner faces 25B, 25B of the restriction housing portion and the outer circumferential face 24A of the housing portion main body 24 to prevent the rotation restriction portion 5 of the packing 1 from being detached from the restriction housing portion 25.

Figure 8:
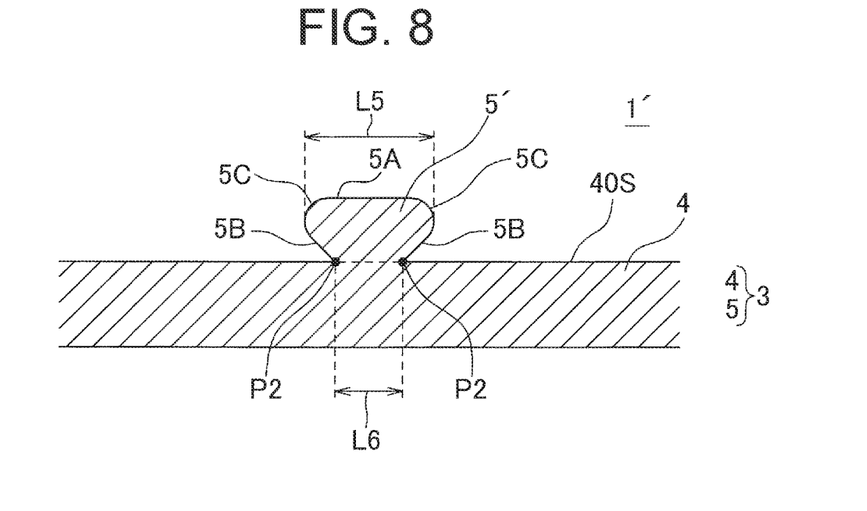
FIG. 8 is a front view of another modified example of the packing arrangement structure.

Furthermore, in the above-described embodiment, each rotation restriction portion 5 is formed such that the angle C between the top face 5A and each of the side faces 5B is an acute angle. However, the present invention is not limited to this. As shown in FIG. 8, each rotation restriction portion 5' of the packing 1' may have a curved face 5C such that the boundary between the top face 5A and each side face 5B is round. FIG. 8 is a front view showing another modified example of the packing arrangement structure. In FIG. 8, the elements having the same or similar function or constitution as the above-described embodiment are indicated using the same reference signs to omit the explanation thereof.

Furthermore, in the above-described embodiment, the packing arrangement structure is included in the connector 10 for an illustrative purpose. However, the present invention is not limited to this. The packing arrangement structure may be applied to other members requiring ensured waterproof performance.

Preferable constitution and method for implementing the present invention have been disclosed herein; however the present invention is not limited to those. That is, although the present invention is shown in the drawings and explained with reference to a certain embodiment, the above-described embodiment may be modified in various ways by a person skilled in the art for its shape, material, number and other detailed constitutions without departing from the scope of the technical idea and the object of the present invention. Therefore, the above-disclosed descriptions providing limitations to shape, material and such are provided for illustrative purpose to facilitate the understanding of the present invention and are not for limiting the present invention. Thus, the members described without a part or complete limitation related to shape, material and such are within the present invention.

LIST OF REFERENCE SIGNS 1, 1' packing
4 insertion plate portion (annular portion main body)
5, 5' rotation restriction portion (protruding portion)
5A top face (top portion)
10A housing body (first member)
24A outer circumferential face (reference face)
25 restriction housing portion (recessed portion)
25A parallel face (first face)

25B inner face (second face)
L5 circumferential dimension of top face (circumferential dimension of top portion)
L6 circumferential dimension between basal parts
P2 boundary location between packing reference face and side face (basal part)
θ1 angle between outer circumferential face and inner face (angle between reference face and second face)

What is claimed is:

1. A packing arrangement structure configured to dispose an annular packing between a first member and a second member, comprising the first member and the annular packing,
    wherein the packing includes an annular portion main body extending in an axial direction of the packing and a protruding portion protruding from the annular portion main body in an outward direction or in an inward direction,
    wherein the first member is provided with a recessed portion configured to house the protruding portion and formed into a shape corresponding to the protruding portion,
    wherein the protruding portion is formed such that a circumferential dimension of a top portion thereof located in a protruding direction is greater than a circumferential dimension between basal parts thereof, and
    wherein a space extends between the recessed portion and the protruding portion.

2. The packing arrangement structure according to claim 1, wherein the protruding portion is formed into a trapezoidal shape.

3. The packing arrangement structure according to claim 1,
    wherein the recessed portion includes a first face located facing the top portion of the protruding portion, and a pair of second faces located between the first face and a reference face which can contact the annular portion main body, and
    wherein the first member is configured such that an angle between the reference face and each of the second faces is an acute angle.

4. The packing arrangement structure according to claim 2,
    wherein the recessed portion includes a first face located facing the top portion of the protruding portion, and a pair of second faces located between the first face and a reference face which can contact the annular portion main body, and
    wherein the first member is configured such that an angle between the reference face and each of the second faces is an acute angle.

5. The packing arrangement structure according to claim 3, wherein the recessed portion includes a pair of basal parts that are spaced apart from each other with a circumferential dimension that is greater than the circumferential dimension of the top portion of the protruding portion.

6. The packing arrangement structure according to claim 1,
    wherein the recessed portion includes a first face and a pair of inner faces, the inner faces extend from the first face and face each other, and
    wherein the space extends between the projecting portion and at least one of the inner faces.

* * * * *